United States Patent
Sekimura et al.

Patent Number: 5,973,808
Date of Patent: Oct. 26, 1999

[54] OPTICAL FIBER AMPLIFIER

[75] Inventors: Tokushi Sekimura; Hirokazu Hayakawa, both of Tokyo, Japan

[73] Assignee: The Furukawa Electric Co., Ltd., Tokyo, Japan

[21] Appl. No.: 08/795,227

[22] Filed: Jan. 17, 1997

[30] Foreign Application Priority Data

Jan. 19, 1996 [JP] Japan ................................. 8-006931

[51] Int. Cl.[6] .................................................. H04J 14/02
[52] U.S. Cl. ............................ 359/124; 359/179; 359/160
[58] Field of Search .................................. 359/125, 124, 359/174, 176, 179, 341, 160

[56] References Cited

U.S. PATENT DOCUMENTS

| | | | |
|---|---|---|---|
| 5,500,756 | 3/1996 | Tsushima et al. | 359/174 |
| 5,572,357 | 11/1996 | Nakazato et al. | 359/341 |
| 5,701,194 | 12/1997 | Meli et al. | 359/341 |

Primary Examiner—Rafael Bacares
Attorney, Agent, or Firm—Jacobson, Price, Holman & Stern, PLLC

[57] ABSTRACT

An optical fiber amplifier is free from optical oscillation, if operated for high output power level and can be manufactured at low cost. It comprises an input optical fiber 11 for receiving signal light, a first isolator 12 for blocking any return light of the optical signal entered into the input optical fiber 11, an erbium-doped optical fiber 13 for amplifying the entered optical signal, a pumping source 14, a wavelength division multiplexer 15 for coupling the signal light and the excited light from the pumping source 14, an optical signal output optical fiber 16 connected to the wavelength division multiplexer 15 to produce an amplified optical signal, a second isolator 17 arranged on the optical signal output optical fiber 16 and a excited light input optical fiber 19 for connecting the wavelength division multiplexer 15 and the pumping source 14 and the wavelength division multiplexer 15 has a dielectric multilayer filter 18 that reflects signal light and transmits excited light.

1 Claim, 4 Drawing Sheets

WAVELENGTH DEPENDENCY BETWEEN ERBIUM-DOPED OPTICAL FIBER AND OPTICAL SIGNAL OUTPUT OPTICAL FIBER

WAVELENGTH DEPENDENCY BETWEEN ERBIUM-DOPED OPTICAL FIBER AND PUMPING SOURCE

WAVELENGTH DEPENDENCY OF OPERATION OF SIGNAL LIGHT REFLECTION TYPE WDM

WAVELENGTH DEPENDENCY BETWEEN ERBIUM-DOPED OPTICAL FIBER AND OPTICAL SIGNAL OUTPUT OPTICAL FIBER

WAVELENGTH DEPENDENCY BETWEEN ERBIUM-DOPED OPTICAL FIBER AND PUMPING SOURCE

WAVELENGTH DEPENDENCY OF OPERATION OF SIGNAL LIGHT REFLECTION TYPE WDM

OPTICAL FIBER AMPLIFIER

BACKGROUND OF THE INVENTION

1. Field of the Invention

This invention relates to an optical fiber amplifier to be used for optical telecommunications systems.

2. Prior Art

FIG. 4 of the accompanying drawings schematically illustrates a known optical fiber amplifier. The known optical fiber amplifier 50 comprises an input optical fiber 51 for receiving signal light, a first isolator 52 for blocking any return light of the optical signal entered into the input optical fiber 51, an erbium-doped optical fiber 53 for amplifying the entered optical signal, a pumping source 54, a wavelength division multiplexer 55 for coupling the signal light and the excited light coming from the pumping source 54, an optical signal output optical fiber 56 connected to the wavelength division multiplexer 55 to produce an amplified optical signal and a second isolator 57 arranged on the optical signal output optical fiber 56.

The input optical fiber 51 transmits signal light with a wavelength of 1.55 micrometer, for example, to theierbium-doped isolator 53 by way of the first isolator 52. The erbium-doped optical fiber 53 is connected at an end to the wavelength division multiplexer 55, which wavelength division multiplexer 55 is provided with a dielectric multilayer filter 58 in it as shown in FIG. 5 of the accompanying drawings. The dielectric multilayer filter 58 is designed to reflect excited light with a wavelength of 1.48 micrometer, for example, and transmit signal light with a wavelength of 1.5 micrometer therethrough. More specifically, the excited light having the wavelength of 1.48 micrometer and coming from the pumping source 54 is reflected by the dielectric multilayer filter 58 of the wavelength division multiplexer 55 and enters the erbium-doped optical fiber 53 to excite the erbium atoms in the erbium-doped optical fiber 53.

If signal light having the wavelength of 1.5 micrometer is also entered into the erbium-doped optical fiber 53 under this condition, an induced emission occurs there to amplify the signal light with the wavelength of 1.5 micrometer. Then, the amplified signal light with the wavelength of 1.5 micrometer is transmitted through the dielectric multilayer filter 58 of the wavelength division multiplexer and a second isolator 57 arranged in the optical signal output optical fiber 56 before produced as an output signal.

Problem to be Solved by the Invention

The above described known optical fiber amplifier 50 is an amplifier of a backward excitation type comprising a signal light transmission type wavelength division multiplexer designed to reflect excited light and transmit signal light.

It has been found that such an optical fiber amplifier 50 is accompanied by a problem that the amplified signal light is partly reflected by the dielectric multilayer filter 58 of the wavelength division multiplexer 55 and leaks out toward the pumping source 54 when operated for optical amplification at a high output power level.

The signal light leaking toward the pumping source 54 is then reflected by the proximal end of the optical fiber 59 of the pumping source 54 and then by the dielectric multilayer filter 58 to go back into the erbium-doped optical fiber 53 to give rise to a phenomenon optical oscillation there. Such a phenomenon of optical oscillation becomes particularly remarkable when the amplifier is operated for a high-output level of more than 15 dB.

Optical oscillation can be prevented from taking place by arranging an isolator inside the pumping source. However, the use of an isolator in the pumping source inevitably reduces the output level of the pumping source and raises the overall cost of the optical fiber amplifier.

It is, therefore, the object of the present invention to provide an optical fiber amplifier that can prevent optical oscillation from occurring if it is operated for optical amplification at a high-output power level without raising the cost.

Summary of the Invention

According to the invention, the above object is achieved by providing an optical fiber amplifier comprising an input optical fiber for receiving signal light, an erbium-doped optical fiber for amplifying the received optical signal, a wavelength division multiplexer for taking out the optical signal amplified by the erbium-doped optical fiber, a pumping source and an excited light input optical fiber for entering the light emitted from the pumping source into the wavelength division multiplexer, characterized in that said wavelength division multiplexer is provided with a dielectric multilayer filter for reflecting the signal light and transmitting the excited light.

With an optical fiber amplifier according to the invention, optical oscillation can be suppressed by the dielectric multilayer filter of the wavelength division multiplexer that reflects signal light and transmits excited light in a manner as described below.

With a signal light transmission type wavelength division multiplexer 55 of a known optical fiber amplifier 50, there normally exists a ripple of 1 to 5% in the transmission band between the connection terminal 55a of the wavelength division multiplexer 55 on the side of the erbium-doped optical fiber and the corresponding connection terminal 55b on the side of the pumping source as shown by the graph (a) of FIG. 6. The ripple can take part in the reflected light to give rise to optical oscillation. The graph (b) of FIG. 6 illustrates the wavelength dependency of the operation of the wavelength division multiplexer 55 between the connection terminal 55a thereof on the side of the erbium-doped optical fiber and the connection terminal 55c on the side of the optical signal output optical fiber.

More specifically, the signal light leaking toward the pumping source 54 due to the dielectric multilayer filter 58 of the known optical fiber amplifier 50 is cut by 13 to 20 dB and the signal light is reflected by the proximal end of the optical fiber in the pumping source by 14 dB, while the return light heading for the erbium-doped optical fiber 53 after passing through the dielectric multilayer filter 58 again shows a level of 13 to 20 dB. Thus, all in all, the signal light will be returned by 40 to 54 dB.

On the other hand, a signal light reflection type wavelength division multiplexer used in an optical fiber amplifier according to the invention shows a wavelength dependency as illustrated in FIG. 3. More specifically, the signal light leaking toward the pumping source due to the dielectric multilayer filter of an optical fiber amplifier according to the invention is cut by 30 dB or more and the signal light is reflected by the proximal end of the optical fiber in the pumping source by 14 dB, while the return light heading for the erbium-doped optical fiber after passing through the dielectric multilayer filter again is cut by 30 dB or more. Thus, all in all, the signal light will be attenuated by 74 dB or more.

As described above, the return light of signal light heading for the erbium-doped optical fiber is reduced to suppress the occurrence of optical oscillation by using a signal light reflection type wavelength division multiplexer.

Such reduction in the return light of signal light heading for the erbium-doped optical fiber is particularly advantageous for an optical fiber amplifier with a high-output power level.

DESCRIPTION OF A PREFERRED EMBODIMENT

Figure 1:
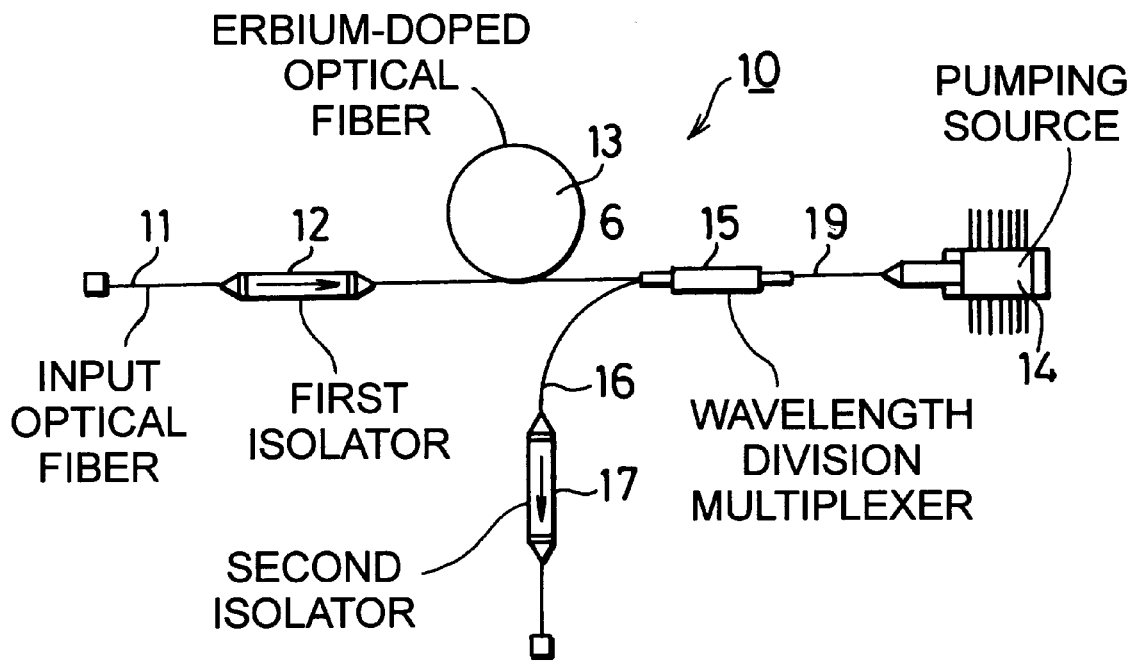
FIG. 1 is a schematic illustration of an embodiment of optical fiber amplifier according to the invention.

Now, the present invention will be described by referring to the accompanied drawings that illustrate a preferred embodiment of the invention. The optical fiber amplifier 10 according to the invention comprises an input optical fiber 11 for receiving signal light, a first isolator 12 for blocking any return light of the optical signal entering into the input optical fiber 11, an erbium-doped optical fiber 13 for amplifying the entering optical signal, a pumping source 14, a wavelength division multiplexer 15 for coupling the signal light and the excited light from the pumping source 14, an optical signal output optical fiber 16 connected to the wavelength division multiplexer 15 to produce an amplified optical signal, a second isolator 17 arranged on the optical signal output optical fiber 16 and a excited light input optical fiber 19 for connecting the wavelength division multiplexer 15 and the pumping source 14.

Figure 2:
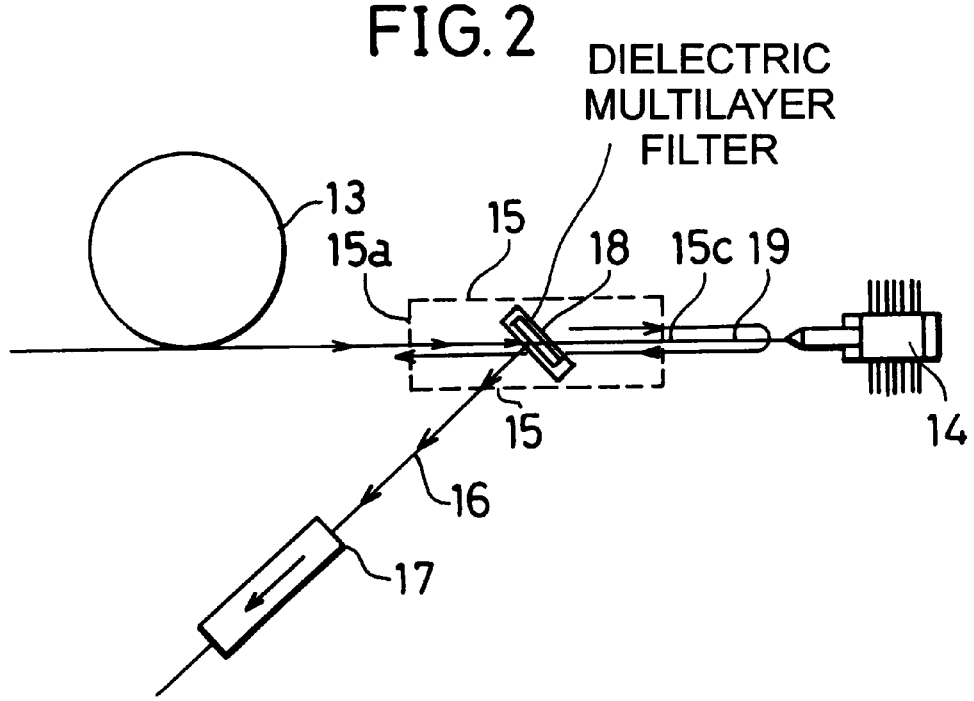
FIG. 2 is an enlarged illustration of the embodiment of FIG. 1, showing its principal area.

The input optical fiber 11 transmits signal light with a wavelength of 1.55 micrometer for example, to the erbium-doped isolator 13 by way of the first isolator 12. The erbium-doped optical fiber 13 is connected at an end to the wavelength division multiplexer 15, which wavelength division multiplexer 15 is provided with a dielectric multilayer filter 18 in it as shown in FIG. 2 of the accompanying drawings. The dielectric multilayer filter 18 is designed to reflect excited light with a wavelength of 1.48 micrometer for example, and transmit signal light with a wavelength of 1.55 micrometer therethrough. More specifically, the excited light having the wavelength of 1.48 micrometer and coming from the pumping source 14 is reflected by the dielectric multilayer filter 18 of the wavelength division multiplexer 15 and enters the erbium-doped optical fiber 13 to excite the erbium atoms in the erbium-doped optical fiber 13.

If signal light having the wavelength of 1.55 micrometer also entering into the erbium-doped optical fiber 13 under this condition, an induced emission occurs there to amplify the signal light with the wavelength of 1.5 micrometer. Then, the amplified signal light with the wavelength of 1.5 micrometer is transmitted through the dielectric multilayer filter 18 of the wavelength division multiplexer and a second isolator 17 arranged in the optical signal output optical fiber 16 before produced as an output signal.

Figure 3A:
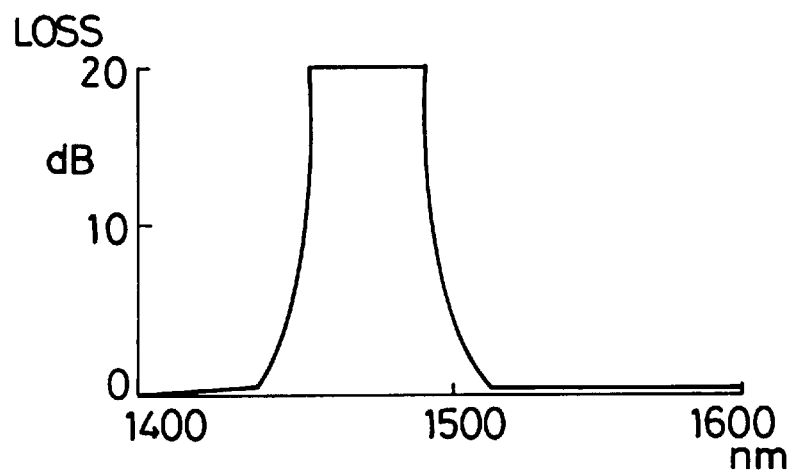
FIG. 3A–3B a graph showing the wavelength dependency of the operation of the wavelength division multiplexer of the embodiment of optical fiber amplifier of FIG. 1.
Figure 3B:
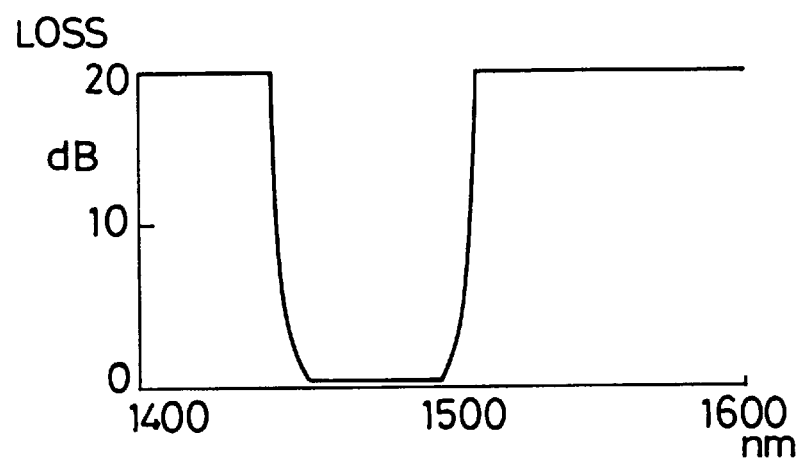
Figure 4:
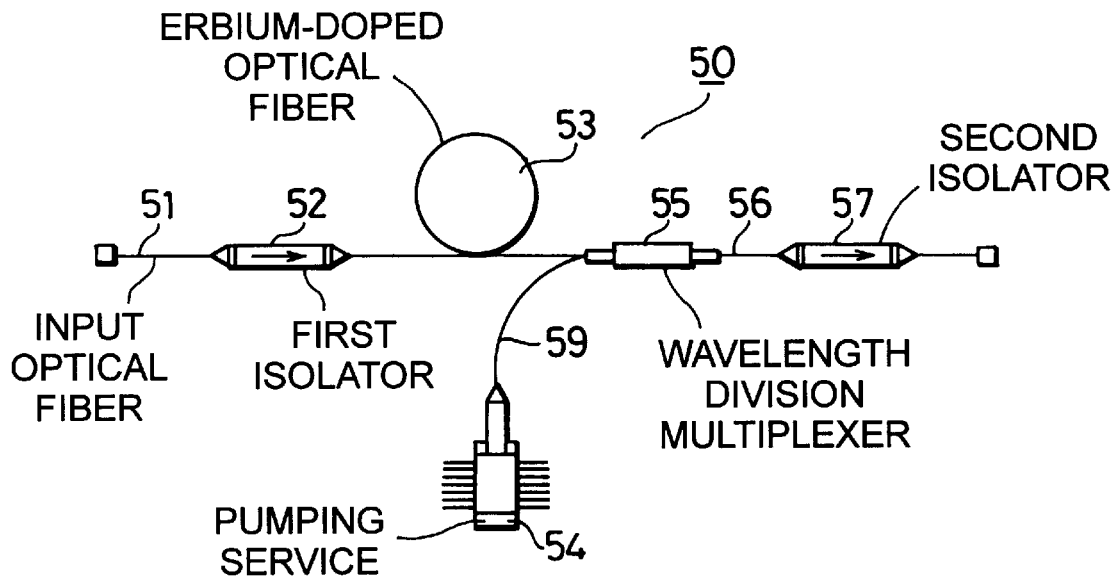
FIG. 4 is a schematic illustration of a known optical fiber amplifier.
Figure 5:
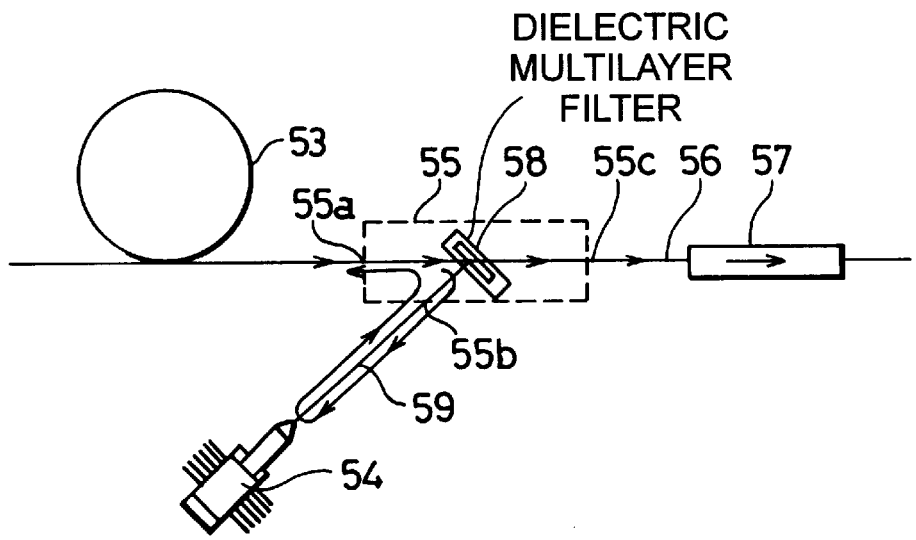
FIG. 5 is an enlarged illustration of the optical fiber amplifier of FIG. 4, showing its principal area.
Figure 6A:
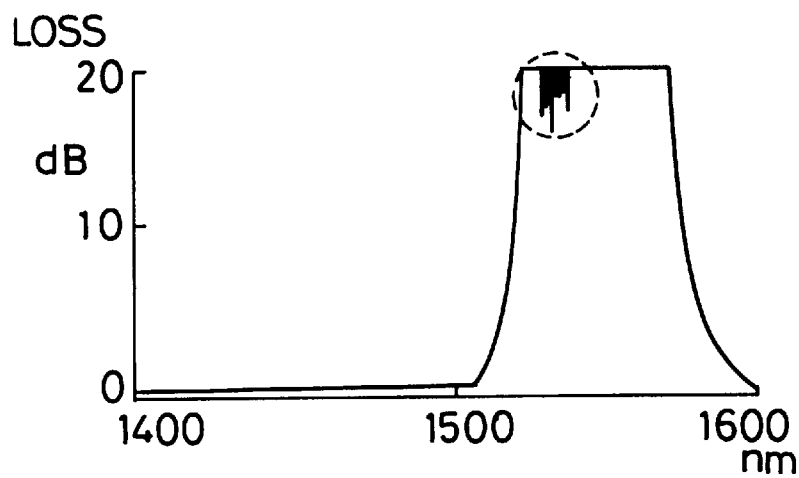
FIG. 6A–6B a graph showing the wavelength dependency of the operation of the wavelength division multiplexer of the optical fiber amplifier of FIG. 4.
Figure 6B:
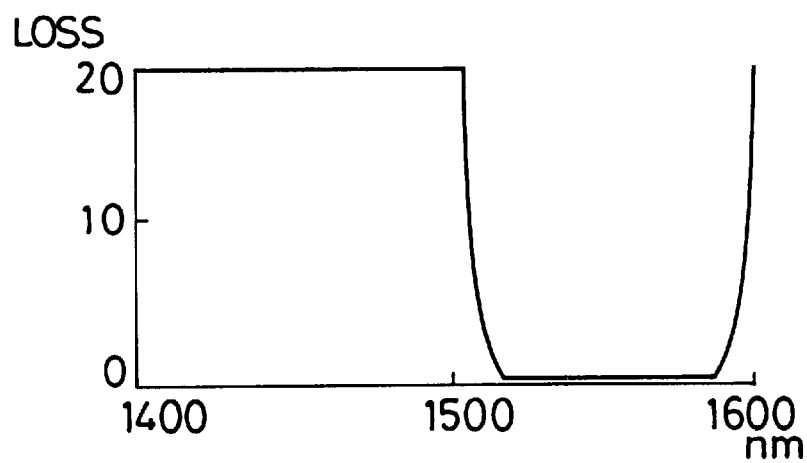

FIG. 3 shows the wavelength dependency of the operation of the wavelength division multiplexer 15 used in this embodiment of optical fiber amplifier. The graph (a) of FIG. 3 illustrates the wavelength dependency between the connection terminal 15a of the wavelength division multiplexer on the side of the erbium-doped pumping source and the connection terminal 15b thereof on the side of the optical signal output optical fiber. The graph (b) of FIG. 3 illustrates the wavelength dependency between the connection terminal 15a on the side of the erbium-doped optical fiber and the connection terminal 15c on the side of the pumping source.

More specifically, the signal light leaking toward the pumping source due to the dielectric multilayer filter 18 of the above embodiment is cut by 30 dB or more and the signal light is reflected by the proximal end of the optical fiber in the pumping source by 14 dB, while the return light heading for the erbium-doped optical fiber after passing through the dielectric multilayer filter again is cut by 30 dB or more. Thus, all in all, the signal light will be attenuated by 74 dB or more.

Thus, there can be realized an optical fiber amplifier that is free from optical oscillation if operating for a high-output power level.

While the above embodiment of optical fiber amplifier is described above as a backward excitation type, the present invention is applicable not only to the backward excitation type but also to the forward and the forward/ backward type to suppress optical oscillation by means of a signal light reflection type wavelength division multiplexer.

While the pumping source of the above embodiment is designed for the excitation optical wavelength of 1.48 micrometer, the present invention is not limited thereto and applicable to the excitation optical wavelength of 0.98 micrometer.

Advantages of the Invention

As described above, according to the invention, there is provided an optical fiber amplifier comprising a wavelength division multiplexer of the signal light reflection type and free from optical oscillation.

Additionally, an optical fiber amplifier according to the invention can be manufactured at reduced cost and be operated for high-output power level because no isolator is arranged between the pumping source and the wavelength division multiplexer.

What is claimed is:

1. An optical fiber amplifier operated at a high output level of more than 15 dB comprising an input optical fiber for receiving signal light, an erbium-doped optical fiber for amplifying the received optical signal, a wavelength division multiplexer for taking out the optical signal amplified by the erbium-doped optical fiber, a pumping source and an excited light input optical fiber for entering the light emitted from the pumping source into the wavelength division multiplexer, characterized in that said wavelength division multiplexer is provided with a dielectric multilayer filter for reflecting the signal light and transmitting the excited light.

* * * * *